US005586805A

United States Patent [19]

Rinehart

[11] Patent Number: 5,586,805
[45] Date of Patent: Dec. 24, 1996

[54] PORTABLE COMBINATION SEAT AND CONTAINER

[75] Inventor: John R. Rinehart, Milton, Wis.

[73] Assignee: American Institute of Taxidermy, Inc., Janesville, Wis.

[21] Appl. No.: 280,497

[22] Filed: Jul. 26, 1994

[51] Int. Cl.⁶ ........................................ A47C 9/00
[52] U.S. Cl. .................. 297/188.09; 297/188.1; 206/216; 220/212
[58] Field of Search .................... 297/188.09, 188.1; 206/216, 372, 805; 220/212

[56] References Cited

U.S. PATENT DOCUMENTS

| | | |
|---|---|---|
| 2,243,498 | 5/1941 | Candioto . |
| 2,651,137 | 9/1953 | Sweet . |
| 2,740,546 | 4/1956 | Kowalski . |
| 2,919,169 | 12/1959 | Jackson . |
| 3,114,574 | 12/1963 | Pryale . |
| 3,344,552 | 10/1967 | Glasco . |
| 3,603,019 | 9/1971 | Smeltzer . |
| 3,746,391 | 7/1973 | Novak ............................. 297/188.1 |
| 3,751,845 | 8/1973 | Van Leeuwen . |
| 4,095,365 | 6/1978 | Ray .................................. 206/805 |
| 4,128,170 | 12/1978 | Elliott . |
| 4,295,680 | 10/1981 | Grasso . |
| 4,487,135 | 12/1984 | Van Ryn . |
| 4,611,726 | 9/1986 | Skinnell . |
| 4,759,148 | 7/1988 | Love . |
| 4,773,709 | 9/1988 | Slinkard . |
| 4,867,332 | 9/1989 | Mains ................................. 206/372 |
| 5,170,516 | 12/1992 | Davison . |
| 5,172,642 | 12/1992 | Iannuzzelli ....................... 297/188.09 |
| 5,344,339 | 9/1994 | Cheslock ............................. 206/372 |

Primary Examiner—Peter M. Cuomo
Assistant Examiner—Anthony D. Barfield
Attorney, Agent, or Firm—Foley & Lardner

[57] ABSTRACT

A portable seat-container for outdoor use is mountable to a conventional five or six gallon bucket and provides a comfortable seat while allowing access to the interior of the bucket. The seat-container is comprised of a half cylindrical receptacle having a receptacle rim, a bottom, a curved sidewall and a flat sidewall. The receptacle rim includes a flange extending from the curved sidewall which is capable of supporting the receptacle on the rim of a bucket so that the curved sidewall abuts the sidewall of the bucket. A lid seat is hingably attached to a straight portion of the receptacle rim. The lid preferably includes a cushion which serves as a comfortable seat, and may also include a latch for releasably holding the lid seat closed on the receptacle.

13 Claims, 1 Drawing Sheet

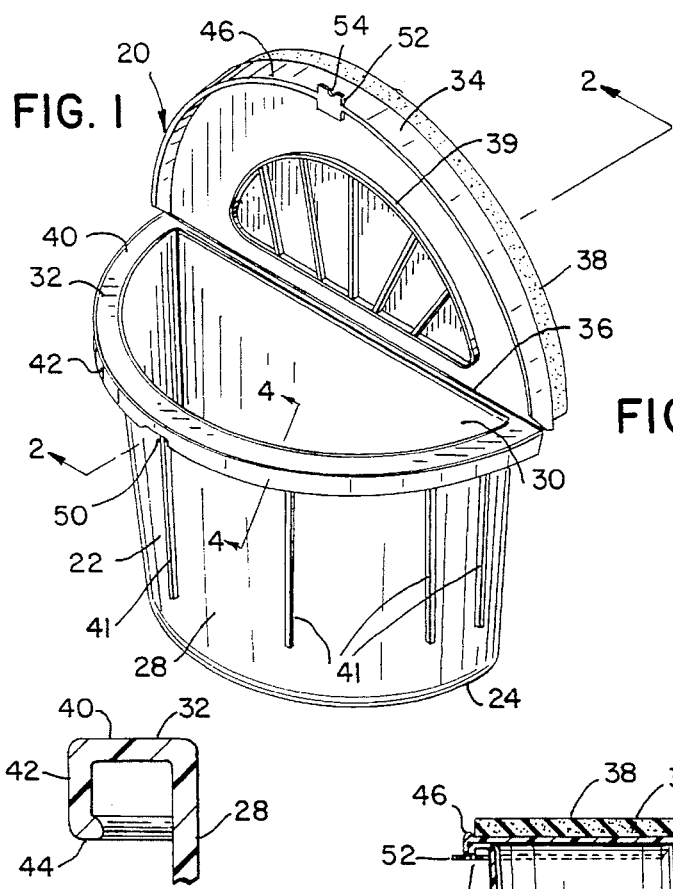
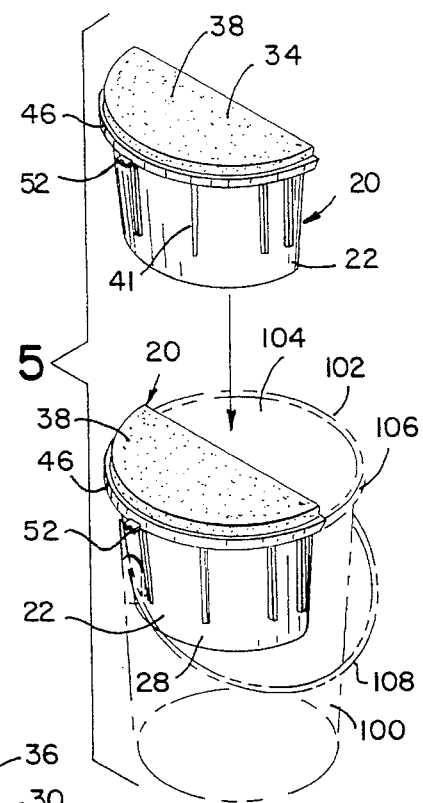
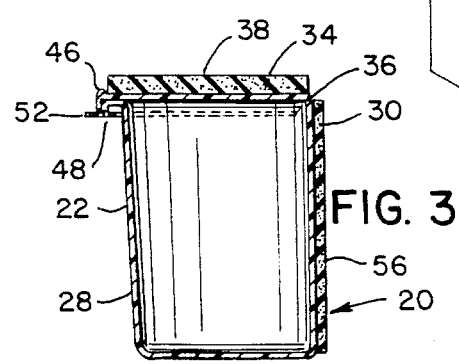
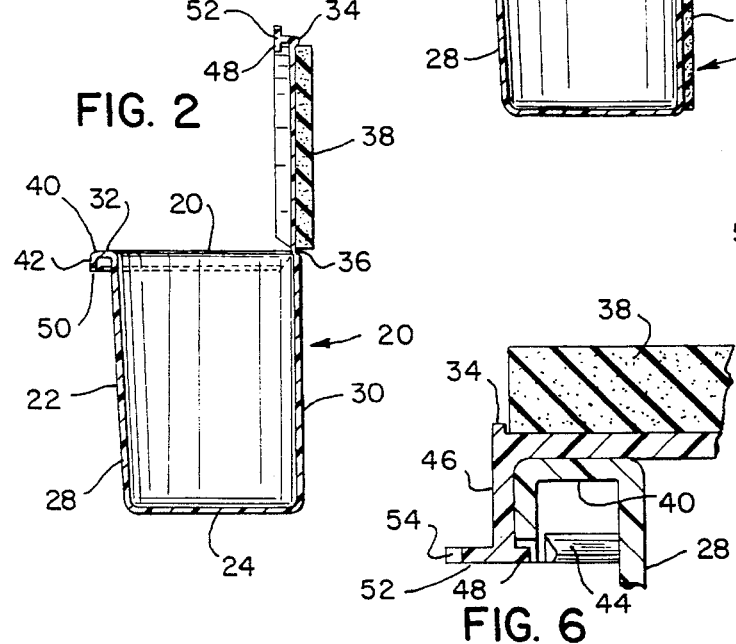
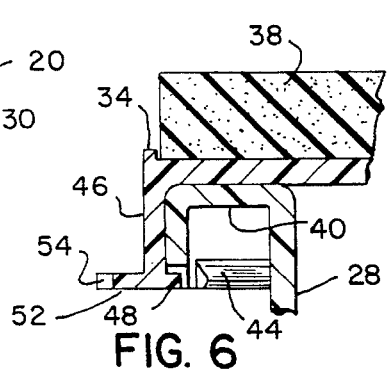
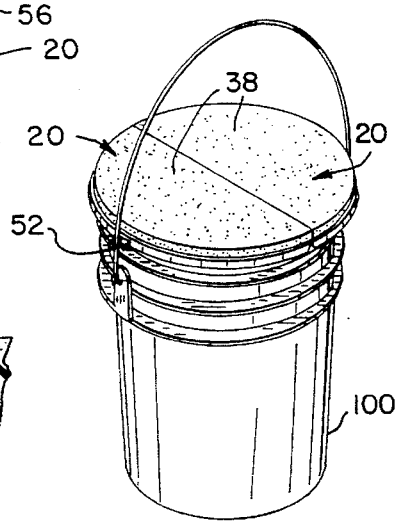

5,586,805

PORTABLE COMBINATION SEAT AND CONTAINER

FIELD OF THE INVENTION

The present invention relates generally to portable containers, and more specifically to containers for recreational use as in fishing.

BACKGROUND OF THE INVENTION

Five or six gallon buckets are commonly used for recreational purposes, for example, as portable bait and fishing equipment containers. Such buckets, which are approximately two feet tall and one foot in diameter at their tops, are often available at low cost from paint and hardware stores. The buckets are generally made of plastic and are provided with a wire handle pivotally attached across the diameter of the bucket. Gardeners, campers, fishers and others commonly use the buckets to carry the implements of their work or sport, e.g., shovels and other tools, fishing tackle, and food and beverages. While such buckets are inexpensive and durable they are often larger than necessary and overly bulky for many uses. As an example, a fisherman may place minnows in water in the bucket so that the minnows may be carried to the fishing site. The water at the bottom of the bucket renders the bucket generally unsuitable for carrying spare clothing, sandwiches, or fishing tackle.

Gardeners, fishers and others engaging in outdoor activity often use such buckets as a seat. For example, a gardener may sit upon the bucket as he or she plants bulbs or pulls weeds. In ice fishing, an overturned bucket is commonly used as a seat. However, there are problems with using the bucket as both a seat and as a storage container. Generally, the bucket must be overturned to be used as a seat and therefore must be emptied.

SUMMARY OF THE INVENTION

The present invention provides a lightweight, portable and compact combination seat and container capable of use with a standard bucket of the type often used for recreational purposes. The seat-container includes a receptacle, having a bottom, a curved sidewall, and a flat sidewall, which are integrally joined to form a half cylinder or preferably a downwardly tapered half cylinder. A rim at the top of the receptacle includes a semi-circular flange extending from the curved sidewall which is capable of supporting the receptacle on the rim of a bucket with the curved sidewall fitting closely adjacent to a portion of the interior surface of the bucket. The receptacle may also have ribs formed in the curved sidewall to reinforce the sidewall, to facilitate easy removal of the seat-container from a bucket, and to protect the sidewall from abrasions by keeping the sidewall spaced from the interior of the bucket.

The container-seat also includes a semi-circular lid seat which is hingably attached to a straight portion of the receptable rim at the top of the flat sidewall, the lid seat rotatable from an open position, wherein the interior of the receptacle may be accessed, to a closed position. The lid seat is capable of serving as a seat when the seat container is either standing alone or when it rests in a bucket. The lid seat may have a cushion secured to its top to provide a more comfortable seat. The lid may also be provided with reinforcing ribs so that it resists buckling when used as a seat. The lid is preferably molded of plastic integrally with the receptacle, with the hinge formed as a thinner section of plastic which is integral with both the lid and the receptacle.

A ridge preferably descends from the flange on the curved receptacle sidewall parallel to the sidewall. When the seat-container is placed in a bucket, the bucket rim engages the receptacle flange between the receptacle ridge and the curved sidewall, thereby preventing the seat-container from moving laterally. The ridge on the receptacle may further include a lip which extends inwardly from a bottom edge of the ridge to further hold the receptacle in place on the bucket.

The lid rim preferably includes a ridge descending from the outer curved peripheral edge of the lid such that when the lid is in the closed position, the lid engages and is supported by the flange on the receptacle, which in turn is supported by the rim of the bucket, and the ridge on the lid is closely adjacent and evenly abuts the ridge on the receptacle. The lid seat may also include a latch for releasably holding the lid on the receptacle when the lid is in the closed position, such as an inwardly extending tongue on the ridge of the lid which engages the rim of the receptacle when the lid is in the closed position.

The seat-container may be equipped with insulation, if desired, such as an insulated receptacle sleeve or liner, to inhibit heat transfer from the receptacle.

Further objects, features, and advantages of the invention will be apparent from the following detailed description when taken in conjunction with the accompanying drawings.

BRIEF DESCRIPTION OF THE DRAWINGS

In the drawings:

FIG. 1 is a perspective view of the seat-container of the present invention, shown with the lid seat in the open position.

FIG. 2 is a cross-sectional view of the seat-container taken along the line 2—2 in FIG. 1.

FIG. 3 is a cross-sectional view of the seat-container as in FIG. 2, but with the lid shown in the closed position.

FIG. 4 is a cross-sectional view of the rim of the receptacle taken along the line 4—4 in FIG. 1.

FIG. 5 is a perspective view illustrating the placement of the seat-container into a bucket.

FIG. 6 is a cross-sectional view of the receptacle rim and the lid seat rim showing a tongue latch for releasably holding the lid to the receptacle.

FIG. 7 is an illustrative perspective view showing two of the seat-containers of FIG. 1 inserted together in the same bucket.

DETAILED DESCRIPTION OF THE INVENTION

Referring to the drawings, the seat-container of the present invention is shown generally at 20 in FIG. 1. The seat-container 20 has a receptacle 22 formed by a bottom 24 and sidewalls. The sidewalls include a curved sidewall 28 designed to closely fit the interior surface of a standard five or six gallon bucket when the receptacle 22 is placed within the bucket. As shown in FIG. 1, the curved sidewall 28 has a tapered hemi-cylindrical (half cylinder) form to enable the seat-container 20 to fit into a conventional tapered cylindrical bucket. The sidewalls also include a flat sidewall 30. The sidewalls 28 and 30 are integrally joined to each other and to the bottom 24.

The top of the receptacle 22 is bounded by a rim 32, which includes a flange 40 extending outwardly from the curved sidewall 28. The flange 40 supports the seat-container 20 on the rim of a bucket, as described further below.

A semi-circular lid seat 34 is joined by a hinge 36 at its straight edge to a straight portion of the receptacle rim 32 at the top of the flat sidewall 30. The hinge 36 at the top of the flat sidewall 30 is preferably an integral or "living" hinge, with the receptacle 22 and the lid seat 34 preferably being formed of injection molded plastic which also forms the hinge 36 defined by a thinner region of plastic. The lid 34 may thus rotate about the hinge 36 between an open position, as shown in FIGS. 1 and 2, and a closed position as shown in FIG. 3.

Because the lid 34 of the seat-container 20 is intended to be used as a seat, it is preferable that the lid 34 include a cushion 38 so that a prolonged period of sitting will not cause discomfort. The cushion 38 may be made of various materials such as foam rubber or a cloth sleeve filled with stuffing, which is then glued or otherwise secured to the lid 34. A foam rubber or foam plastic cushion 38 is preferred for durability and ease of cleaning.

The lid 34 preferably includes reinforcing ribs 39 molded into the lid to allow it to support the weight of a seated person. The reinforcing ribs 39 may be located on the underside of the lid 34, as shown in FIG. 1, or on the top side of the lid 34, where the ribs may then be covered by the cushion 38.

The seat-container 20 is capable of use as a seat both when it rests in a bucket and also by itself. While the sidewalls generally form an adequate base for the lid 34 to function as a sturdy seat when the seat-container is separate from a bucket, structural reinforcement is preferably provided by support ribs 41 molded in the curved sidewall 28, as shown in FIG. 1. The support ribs 41 on the sidewall 28 also provide the added benefit of holding the sidewall 28 spaced away from the interior surface of the bucket, thereby breaking any suction that may develop between the curved sidewall 28 and the bucket to allow easier removal of the seat-container 20 from the bucket 100, and the ribs 41 also protect the sidewall from abrasion.

The seat-container 20 has a size and configuration selected to allow it to fit snugly into about one-half of a standard bucket, so that a user can still gain access to the interior of a bucket 100 because the seat-container 20 covers less than the entire bucket mouth 104, as illustrated in FIG. 5. Therefore, the user may still reach into the area of the bucket 100 not covered by the seat-container 20 to retrieve items within. Generally, standard five and six gallon buckets have an inside diameter of about eleven inches at the mouth of the bucket, and the receptacle 22 and the rim thereon are preferably sized to fit such a bucket, although other sizes may be used as appropriate.

The seat-container 20 covers half of the bucket mouth 104. Two seat-containers 20 may be used together atop the same bucket 100, as illustrated in FIG. 7. The two seat-containers 20 are placed in positions adjacent to one another in the same bucket 100, each having a flat sidewall 30 abutting a flat sidewall 30 on the other seat-container 20 to form a seat which covers the entire top of the bucket. An advantage of the seat-container 20 is that even if the entire bucket mouth 104 is covered by two seat-containers 20, the user may sit on one seat-container 20 and open the other, or remove the other entirely, and reach within the bucket 100 while remaining seated.

To inhibit dislodgement of the seat-container 20 from a bucket, a ridge 42 preferably is formed to descend from the outer edge of the receptacle flange 40. When the seat-container 20 is mounted on a bucket, the bucket rim 102 will engage the bottom surface of the flange 40 between the ridge 42 and the curved sidewall 28. The ridge 42 engages the bucket rim 102 when the seat-container 20 is subjected to lateral forces, and the ridge 42 reinforces the flange 40 so that the flange 40 can fully support an individual seated on the container-seat 20.

To further inhibit dislodgement of the seat-container 20, a lip 44 preferably extends inwardly from the bottom edge of the ridge 42, as best shown in FIG. 4. Most common five and six gallon buckets 100, if they are made for use with a bucket lid, include a rim flange 106 on the bucket rim 104 so that the bucket lid may engage the rim flange 106 and "snap" the bucket lid onto the bucket rim 104. When the seat-container 20 is inserted in position on the bucket, the bucket rim flange 106 is engaged by the lip 44 to help prevent dislodgement of the seat-container 20 from the bucket rim 104 if the bucket 100 should become overturned.

Most common five and six gallon buckets are equipped with a half circle wire handle 108 which is hingably attached to the bucket sidewalls. The handle 108 may be swung from a position adjacent to the bucket sidewalls to a position where it rests at least partially over the bucket mouth 104. A tongue 52 with a notch 54 is preferably formed on the bottom of the ridge 42 extending outwardly. The notch 54 has dimensions that closely match the diameter of the handle wire 108 so that the handle wire 108 may be inserted into the notch 54 in a close-fitting manner. As best shown in FIG. 7, when the seat-container 20 is placed in position on the bucket rim 102, the handle wire 108 of the bucket may be pivoted upwardly into a vertical position where it engages and rests within the notch 54. This engagement helps prevent the seat-container 20 from sliding about the bucket rim 102.

As best shown in FIG. 6, a ridge 46 is formed to descend from the curved periphery of the lid 34, and preferably is closely adjacent to and even abuts the ridge 42 when the lid 34 is in the closed position, and therefore helps to provide a relatively tight seal between the receptacle rim 32 and the lid 34. To releasably hold the lid 34 in a closed position, a latch is formed by a tongue 48, preferably extending inwardly from the bottom of the ridge 46 at the position of the tongue 52, which engages a wall of a groove 50 in the ridge 42 when the lid 34 is in the closed position. When the user wishes to release the lid seat from the receptacle, the user can push up on the tongue 52, which draws the latch tongue 48 away from engagement with the wall of the groove 50 in the ridge 42.

For durability and ease of manufacture, the seat-container 20 preferably is molded of plastic in a single piece. The preferred plastic is polypropylene due to its durability and light weight, and also because its properties are well-suited to form an integral hinge 36. The receptacle 22 of the seat-container 20 may be equipped with heat insulation, such as an insulated sleeve or liner, to inhibit heat transfer from the receptacle 22. For example, the receptacle 22 may fit within a foam rubber sleeve 56 (which may extend around the receptacle or only on the flat sidewall 30) to help maintain the contents of the seat-container 20 at a relatively constant temperature. Since such a sleeve 56 is compressible, it does not prevent the receptacle 22 from properly mounting in the bucket. Insulation may also be provided by a molded styrofoam liner (not shown) which fits closely within the receptacle 22. The cushion 38 on the lid 34 provides an insulating barrier for the top of the seat-container 20, thereby allowing the seat-container 20 to form an insulated enclosure.

It is understood that the invention is not confined to the particular construction and arrangement of parts herein illustrated and described, but embraces such modified forms thereof as come within the scope of the following claims.

What is claimed is:

1. A seat-container capable of use with a generally cylindrical bucket having a circular bucket rim bounding the interior of the bucket surface, comprising:

a receptacle having a bottom, a flat sidewall joined to the bottom, a curved sidewall joined to the bottom and the flat sidewall, a rim having a straight portion at the top of the flat sidewall and a semicircular portion at the top of the curved sidewall, the rim including a receptacle flange extending outwardly from the curved sidewall which is capable of supporting the receptacle on the bucket rim when the receptacle rests within a portion of the interior of the bucket, and further including a ridge which extends downwardly from an outer edge of the receptacle flange, the bottom, sidewalls and rim integrally formed of plastic;

a lid seat having a semicircular shape with a straight edge, and an integral hinge connecting the straight edge of the lid seat to the straight portion of the receptacle rim, the lid seat sized so that when the lid seat is in a closed position on the receptacle it extends over the rim flange of the receptacle to be firmly supported about the periphery of the lid seat by the rim of the receptacle such that the lid seat will support an individual seated on the lid seat wherein the lid seat includes a ridge which extends downwardly from a curved outer edge of the lid seat such when the lid seat is in the closed position, the ridge the lid seat extends downwardly closely adjacent to the ridge on the receptacle flange; and wherein the receptacle, the hinge, and the lid seat are integrally formed of plastic such that the hinge is defined by a region of plastic which is thinner than the plastic forming the receptacle and lid seat.

2. The seat-container of claim 1 including a cushion secured to a top surface of the lid seat.

3. The seat-container of claim 1 wherein the receptacle, the hinge and the lid seat are integrally formed of injection molded plastic.

4. The seat-container of claim 1 including latch means for releasably holding the lid seat to the receptacle rim when the lid seat is in the closed position.

5. The seat-container of claim 4 wherein the latch means comprises a tongue which extends inwardly from the ridge of the lid seat to engage the ridge on the receptacle when the lid seat is in the closed position.

6. The seat-container of claim 1 including reinforcing ribs formed integrally with the lid seat which extend out from a surface of the lid seat.

7. The seat-container of claim 1 including an inwardly extending lip formed at a bottom edge of the ridge of the receptacle, the lip adapted to engage portions of the rim of a bucket on which the seat-container is mounted.

8. The seat-container of claim 1 further including a plurality of ribs formed integrally with and extending from an outer side of the curved sidewall of the receptacle thereby to hold the curved sidewall spaced away from an interior surface of a bucket into which the seat-container may be inserted to break any suction that may develop between the curved sidewall and the bucket.

9. The seat container of claim 1 including latch means for releasably holding the lid seat to the receptacle rim when the lid seat is in the closed position.

10. A seat-container capable of use with a generally cylindrical bucket having a circular bucket rim bounding the interior of the bucket surface, comprising:

a receptacle having a bottom, a flat sidewall joined to the bottom, a curved sidewall joined to the bottom and the flat sidewall, a rim having a straight portion at the top of the flat sidewall and a semicircular portion at the top of the curved sidewall, the rim including a flange extending outwardly from the curved sidewall which is capable of supporting the receptacle on the bucket rim when the receptacle rests within a portion of the interior of the bucket and a ridge which extends downwardly from an outer edge of the receptacle flange, the bottom, sidewalls and rim integrally formed of plastic; and and lid seat having a semicircular shape with a straight edge, a hinge connecting the straight edge of the lid seat to the straight portion of the receptacle rim, and a ridge which extends downwardly from a curved outer edge of the lid, the lid seat sized so that when the lid seat is in a closed position on the receptacle it extends over the rim flange of the receptacle to be firmly supported about the periphery of the lid seat by the rim of the receptacle such that the lid seat will support an individual seated on the lid seat and such that the ridge on the lid seat extends downwardly closely adjacent to the ridge on the receptacle flange.

11. The seat-container of claim 10 wherein the hinge is an integral hinge, and wherein the receptacle, the hinge and the lid seat are integrally formed of plastic such that the hinge is defined by a region of plastic which is thinner than the plastic forming the receptacle and seat.

12. The seat-container of claim 10 including latch means for releasably holding the lid seat to the receptacle rim when the lid seat is in the closed position.

13. The seat-container of claim 12 wherein the latch means comprises a tongue which extends inwardly from the ridge of the lid seat to engage the ridge on the receptacle when the lid seat is in the closed position.

* * * * *

UNITED STATES PATENT AND TRADEMARK OFFICE
CERTIFICATE OF CORRECTION

PATENT NO. : 5,586,805
DATED      : December 24, 1996
INVENTOR(S): John R. Rinehart It is certified that error appears in the above-identified patent and that said Letters Patent is hereby corrected as shown below:

In Column 2, Line 45 of the Patent, --seat-- should be inserted after "lid" and before "to".

In Column 5, Line 29 of the Patent, "lid seat wherein" should be --lid seat, wherein--.

In Column 5, Line 31 of the Patent, --that-- should be inserted after "such" and before "when".

Signed and Sealed this

Twenty-fourth Day of March, 1998

Attest:

BRUCE LEHMAN

*Attesting Officer*        *Commissioner of Patents and Trademarks*